Figure 1:
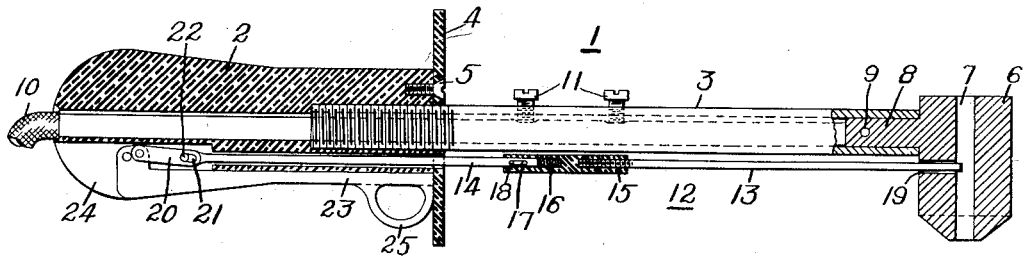

R. E. B. WAKEFIELD.
WELDING TOOL.
APPLICATION FILED NOV. 6, 1919.

1,343,242.

Patented June 15, 1920.

WITNESSES:
J. A. Helsel
O. E. Bee.

INVENTOR
Richard E. B. Wakefield.
BY
Wesley L. Carr
ATTORNEY

UNITED STATES PATENT OFFICE.

RICHARD E. B. WAKEFIELD, OF WILKINSBURG, PENNSYLVANIA, ASSIGNOR TO WESTINGHOUSE ELECTRIC & MANUFACTURING COMPANY, A CORPORATION OF PENNSYLVANIA.

WELDING-TOOL.

1,343,242.   Specification of Letters Patent.   Patented June 15, 1920.

Application filed November 6, 1919. Serial No. 335,999.

*To all whom it may concern:*

Be it known that I, RICHARD E. B. WAKEFIELD, a citizen of the United States, and a resident of Wilkinsburg, in the county of Allegheny and State of Pennsylvania, have invented a new and useful Improvement in Welding-Tools, of which the following is a specification.

My invention relates to welding tools and it has, for its primary object the provision of welding tools which shall be relatively simple in construction and exceptionally durable and effective in operation.

A welding tool is a very important part of the equipment in an electric-arc welding system and it is particularly desirable that the tools shall effect a gripping action upon the pencil filler material which shall not be impaired by continued use of the tool and which shall be sufficiently effective to permit of applying sudden stresses to the pencil without removing it from the electrode holder.

It is frequently necessary to apply relatively great mechanical strains to the pencil, or electrode, in order to free it from work to which it has become fused or "frozen." The electrode "freezes" to the work if the operator does not withdraw it quickly enough after making an engagement between the electrode and the work, preliminarily to establishing an arc. In order to free the electrode, either a sudden twist or a strong pull must be exerted upon the electrode holder, and, unless the gripping means of the welding tool is particularly effective, the electrode will be forcibly removed from the holder, consequently interrupting the welding operation.

In welding tools constructed heretofore, springs have been employed to exert pressure upon a rod or gripping member which engages the electrode and maintains it in position in the holder. The springs become weakened by continued use and the force with which the gripping member engages the electrode is, consequently, materially reduced.

One object of my invention is to provide a welding tool having an electrode-gripping member to be actuated by a lever arm which also maintains the gripping member in position.

A still further object of my invention is to provide a welding tool in which electrodes of various diameters may be employed without changing any of the elements constituting the welding tool.

With these and other objects in view, my invention will be more fully described, illustrated in the drawings, in the several views of which corresponding numerals indicate like parts, and then particularly pointed out in the claims.

Figure 2:
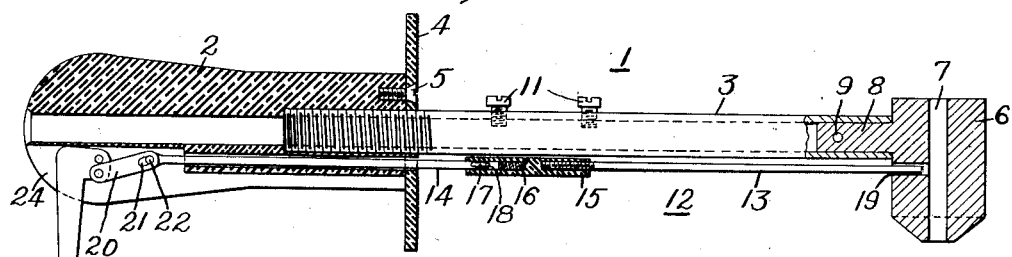
Figure 3:
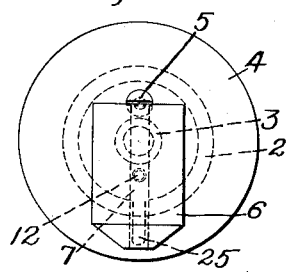

In the drawings, Figure 1 is a side view, partly in elevation and partly in section, of a welding tool embodying my invention; Fig. 2 is a similar view, showing the gripping member thereof in its open position and the electrode holder in readiness to receive an electrode; Fig. 3 is an end view of the holder shown in Fig. 1, and Fig. 4 is a detail view of a modified form of gripping member.

In Fig. 1 is shown a welding tool 1 comprising a hollow handle 2, formed of any suitable insulating material, within one end of which a tubular metallic supporting member 3 may be secured. A shield 4, formed of any suitable material and provided with a central opening, may be disposed about the supporting member 3 and be secured to the face of the handle 2 by any suitable means, such as a screw 5. An electrode holder 6, provided with an electrode-receiving chamber 7 and a projecting portion 8, may be secured to the supporting member 3 by inserting the projecting portion 8 into the end of the member 3. The projecting portion 8 and member 3 may be provided with alined openings 9 to receive a suitable rivet or bolt for maintaining the electrode holder 6 in place. The electrode holder 6 may be electrically connected to a conductor of a supply circuit by extending a cable 10 through the opening in the handle 2 and into the supporting member 3, where it may be made to engage the projecting portion 8. However, since the supporting member 3 is of conducting material, the cable may be secured within the member 3 by screws 11 to make good contact therewith, and, since close engagement is maintained between the holder 6 and the member 3, the cable need not extend through the member 3 until it engages the projecting portion 8.

A two-part gripping member 12 may be formed by employing a plurality of rods 13 and 14 to be maintained in alinement and in spaced relation by an insulating member 15. The rod 13 is, preferably, rigidly secured in one end of the insulating member 15, and the rod 14 is disposed in a recess in the other end of the member 15 within which a spring 16 is first disposed in such manner as to engage the end of the rod 14 and the wall of the recess. The rod 14 is preferably secured within the recess by providing a slot 17 in the rod and a similar slot in the wall of the insulator 15 in which a pin 18 may be disposed to maintain the rod within the member 15. One end of the gripping member 12 is disposed within an opening 19, communicating with the electrode-receiving chamber 7 of the electrode holder 6, and the other end thereof is extended through alined openings in the shield 4 and the handle 2. A link 20, provided with a slot 21, is secured to the end of the gripping member 12 by a pin 22 which is free to move in the slot, and the other end of the link 20 is pivotally secured to the laterally projecting end of a lever arm 23. The lever arm 23 is pivotally mounted in a recess 24 provided therefor in the handle 2. The lever 23 is provided with a projecting grip 25 which may be utilized to operate the lever to actuate the gripping member 12. In the closed position, as shown in Fig. 1, the lever arm seats within the recess in the handle 2 and conforms to the outline of the handle so that only the grip 25 projects therefrom.

Figure 4:
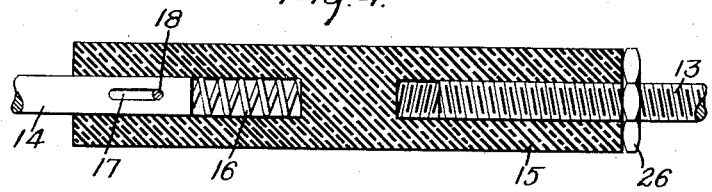

In Fig. 4 is shown means for changing the total length of the gripping member 12, which may assist in compensating for electrodes of various sizes. The rod 13 is provided with a threaded surface at one end which may be screwed into the member 15. A nut 26 may be advanced upon the threaded portion of the rod 13, projecting from the member 15, to engage the end of the member and secure the rod in any adjusted position. Such an arrangement permits of the employment of electrodes of a considerable number of different sizes.

In operating the welding tool 1, one conductor of the electric supply circuit must be connected to the electrode holder 4. After the cable has been suitably connected to the electrode holder 6, the lever arm 23 may be actuated by applying a downward pressure upon the grip 25 to bring the lever arm into the position shown in Fig. 2. When the lever arm is swung down into its open position, the link 20 is pulled toward the end of the handle 2 farthest from the electrode holder 6 and the pin 22, securing the rod 14 to the link, moves into the other end of the slot 21 and thereafter transmits a pull upon the gripping member 12 to withdraw it from the electrode-receiving chamber 7. An electrode may then be disposed in the receiving chamber 7 and the lever arm may be forced back into the recess provided in the handle 2, the link and gripping member assuming the positions shown in Fig. 1. It will be appreciated that the rod 14 of the gripping member 12 moves within the insulating member 15 to a distance limited by the slot which receives the pin 18. The permissible movement of the rod 14, within the insulating member 12, allows the spring 21 to expand or to be compressed accordingly as the rod 11 engages or disengages an electrode disposed within the receiving chamber of the electrode holder.

It will be apparent from the foregoing description that, by employing a lever arm and slotted link to exert a pressure upon the gripping member, a stronger mechanical force may be applied at the end of the gripping member than would be possible if the force were obtained entirely by means of a spring. Although I employ a spring in the construction of the gripping member, it is only utilized in order to provide for transmitting the pressure which is applied by mechanical means. The employment of a spring permits of variations in the size of the electrode which may be secured within the electrode holder and is, therefore, of advantage on this account. It will be appreciated, however, that the gripping member would be effective if constructed without employing a resilient member to transmit the pressure applied by the link and lever arm and it may be omitted, therefore, if desired.

Although I have shown and specifically described a welding tool that embodies my invention, it is obvious that minor changes may be made in the construction thereof without departing from the spirit or scope of my invention, and I desire, therefore, that no limitations shall be imposed except such as are indicated in the appended claims.

I claim as my invention:—

1. A welding tool comprising an electrode holder, a supporting member therefor, a handle for the supporting member and means for engaging an electrode disposed in the holder, said means including a gripping member and means, pivotally secured to the handle, for actuating the gripping member and for maintaining it in position.

2. A welding tool comprising an electrode holder, a supporting member therefor, a handle for the supporting member and means for engaging an electrode disposed in the holder, said means including a gripping member, a lever arm, pivotally secured to the handle, for actuating the gripping member and for maintaining it in position.

3. A welding tool comprising an electrode holder, a supporting member therefor, a handle for the supporting member and means for engaging an electrode disposed in the holder, said means including a rod and a lever arm, pivotally secured to the handle, for actuating the rod and for maintaining it in position.

4. A welding tool comprising an electrode holder, a supporting member therefor, a handle for the supporting member and means for engaging the electrode disposed in the holder, said means including a gripping member, a link connected thereto, and a lever arm so connected to the link and secured to the handle as to be adapted to actuate the gripping member and maintain it in position.

5. A welding tool comprising an electrode holder, a supporting member therefor, a handle for the supporting member and means for engaging the electrode disposed in the holder, said means including a two-part rod, a link connected thereto, and a lever arm so connected to the link and secured to the handle as to be adapted to actuate the rod and to maintain it in position.

6. A welding tool comprising an electrode holder, a supporting member therefor, a handle for the supporting member and means for engaging the electrode disposed in the holder, said means including an insulating member, a two-part rod connected by the insulating member, a slotted link connected to the rod by a pin movably secured in the slot of the link and a lever arm so connected to the link and secured to the handle as to be adapted to actuate the rod and to maintain it in position.

7. A welding tool comprising an electrode holder, a supporting member therefor, a handle for the supporting member, means for engaging an electrode disposed in the holder. said means including a gripping member and means, pivotally secured to the handle, for actuating the gripping member and maintaining it in position and means for compensating for electrodes of different sizes.

8. A welding tool comprising an electrode holder, a supporting member therefor, a handle for the supporting member, means for engaging an electrode disposed in the holder, said means including a gripping member and means, pivotally secured to the handle, for actuating the gripping member and maintaining it in position, and resilient means for compensating for electrodes of different sizes.

9. A welding tool comprising an electrode holder, a supporting member therefor, a handle for the supporting member, a shield disposed between the handle and the electrode holder, an insulating member, a two-part gripping member connected by the insulating member and extended through the shield into an opening provided in the handle, and a lever arm, pivotally secured to the handle, so connected to the gripping member as to be adapted to actuate it and to maintain it in position.

10. A welding tool comprising an electrode holder, a supporting member therefor, a handle for the supporting member, a shield disposed between the handle and the electrode holder, an insulating member, a two-part gripping member connected by the insulating member and extended through the shield into an opening provided in the handle, a lever arm, pivotally secured to the handle, so connected to the gripping member as to be adapted to actuate it and to maintain it in position and resilient means disposed in the insulating member for compensating for electrodes of different sizes.

11. A welding tool comprising an electrode holder, a supporting member therefor, a handle for the supporting member, and means for engaging an electrode disposed in the holder, said means including a gripping member, means for varying the length of the gripping member and means, pivotally secured to the handle, for actuating the gripping member and for maintaining it in position.

In testimony whereof, I have hereunto subscribed my name this 24th day of Oct., 1919.

RICHARD E. B. WAKEFIELD.